(12) United States Patent
Sakaguchi et al.

(10) Patent No.: US 8,621,829 B2
(45) Date of Patent: Jan. 7, 2014

(54) THERMOPLASTIC RESIN CONTAINER FOR WHICH COMPLETION OF RETORT PROCESSING CAN BE CONFIRMED AND METHOD FOR PRODUCING THE SAME

(75) Inventors: Toshiki Sakaguchi, Yokohama (JP); Atsushi Komiya, Yokohama (JP); Yuuki Satou, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 1008 days.

(21) Appl. No.: 12/447,020

(22) PCT Filed: Oct. 29, 2007

(86) PCT No.: PCT/JP2007/071063
§ 371 (c)(1),
(2), (4) Date: Nov. 24, 2009

(87) PCT Pub. No.: WO2008/050890
PCT Pub. Date: May 2, 2008

(65) Prior Publication Data
US 2011/0076432 A1    Mar. 31, 2011

(30) Foreign Application Priority Data
Oct. 27, 2006 (JP) ................................. 2006-293362

(51) Int. Cl.
*B65B 55/14* (2006.01)
(52) U.S. Cl.
USPC .................... 53/440; 53/428; 53/433; 53/127
(58) Field of Classification Search
USPC ............ 493/52, 84–85, 89, 374; 53/425, 428, 53/440, 442, 452, 113, 111 R, 122, 514, 53/127, 507, 433
See application file for complete search history.

(56) References Cited

U.S. PATENT DOCUMENTS

| | | | | |
|---|---|---|---|---|
| 5,735,420 A | * | 4/1998 | Nakamaki et al. | 215/373 |
| 5,906,286 A | * | 5/1999 | Matsuno et al. | 215/375 |
| 6,090,334 A | * | 7/2000 | Matsuno et al. | 264/458 |
| 2009/0091067 A1 | * | 4/2009 | Trude et al. | 264/526 |

FOREIGN PATENT DOCUMENTS

| | | |
|---|---|---|
| JP | 3353614 B2 | 12/2002 |
| JP | 2005-313932 A | 11/2005 |

OTHER PUBLICATIONS

Machine Translation of JP 2005-313932 (Oct. 2005).*
International Search Report of PCT/JP2007/071063, date of mailing Dec. 11, 2007.

* cited by examiner

*Primary Examiner* — Christopher Harmon
(74) *Attorney, Agent, or Firm* — Westerman, Hattori, Daniels & Adrian, LLP (57) ABSTRACT

To provide a thermoplastic resin container that contains food or drink subjected to a retort processing for which completion of the retort processing can be confirmed and supervised with simple means without the need of an expensive member or facility, not only whether the temperature of the retort processing is reached but also whether the retort processing is performed as specified can be confirmed, and the consumer also can easily confirm completion of the retort processing of the product. The container is produced by two-stage stretch blow molding of a preform made of a thermoplastic resin in such a manner a part that is not stretched or is insufficiently stretched is formed at a part of the container, and the part that is not stretched or is insufficiently stretched is whitened to form a retort processing completion confirming part by heating in the retort processing after a content is packed and sealed in the container.

2 Claims, 3 Drawing Sheets

THERMOPLASTIC RESIN CONTAINER FOR WHICH COMPLETION OF RETORT PROCESSING CAN BE CONFIRMED AND METHOD FOR PRODUCING THE SAME

TECHNICAL FIELD

The present invention relates to a thermoplastic resin container for which completion of a retort processing can be confirmed and a method for producing the same. More specifically, it relates to a thermoplastic resin container for which whether a retort processing to which the container has to be subject is completed or not can be readily confirmed, and a method for producing the container that involves forming the container from a thermoplastic resin preform by stretch blow molding and forming a part thereof for which completion of the retort processing can be confirmed during a subsequent retort heating processing.

BACKGROUND ART

In the recent trend toward more convenient daily life and more diverse lifestyles, the demand and preference for cans and plastic containers for food and drink are increasing, as is implied by the compact portable PET bottle particularly favored by consumers. Besides, from the viewpoint of improving the safety supervision of food and drink, it is important to perform a retort processing (a high-temperature heating processing) for heat sterilization after packing and sealing a food or drink in the can or plastic container.

The production step of performing a retort processing with a retort apparatus after packing and sealing a food or drink is essential for killing putrefying bacteria and preventing the food or drink from becoming rotten during the shelf life by heating the food or drink to high temperature and for allowing long storage of the food or drink without quality or flavor change by sterilizing bacteria. Therefore, by applying a label that proves that the retort processing is completed to the product collecting box or using heat sensitive paper that changes color as a result of heating, for example, the production operator has to confirm and closely supervise that the product has been subjected to the retort processing in the production process.

However, such confirmation and supervision are a significant burden on the production operator, and perfect confirmation and supervision are not always ensured, so that a product that has not been subjected to the retort processing can be accidentally shipped. In such a case, the food or drink can change the flavor, and if the food or drink becomes rotten, it is a serious problem for the producer and the consumer.

In order to prevent such a problem while removing the burden on the production operator involved in confirmation and supervision of whether the retort processing of the product is completed and increasing the production efficiency, the retort processing step can essentially be automated and incorporated in the production line. However, the retort processing typically requires a temperature of 100 degrees or higher and takes several minutes or longer, and the conditions are delicate and hard to control. In addition, the conditions for the retort processing vary with the kind of food or drink, so that it is not easy to reliably and properly perform the retort processing in the automated retort processing step. In addition, if a trouble occurs in the automated retort processing step or other steps in the automated production line, a product that has been insufficiently subjected to or has not been subjected to the retort processing can be accidentally produced and shipped after trouble shooting by the production operator and restart of the production line.

In view of such circumstances, there have been developed various kinds of techniques for preventing the problem described above, removing the burden on the production operator involved in confirmation and supervision of whether the retort processing of the product is completed and strictly and reliably confirming and supervising completion of the retort processing of the product.

According to a basic and relatively simple technique, a heat-sensitive ink material that changes or loses color at the high temperature of the retort processing is used. Specifically, for example, there have been proposed an inexpensive retort packaging sheet that comprises a laminate packaging sheet and an indicator ink layer capable of changing color by steam at a sterilization temperature formed between films of the laminate packaging sheet (see the patent literature 1) and a defective can detecting method that involves printing production data (internal pressure of the can or the like) on the can using a fluorescent heat-sensitive ink capable of changing or losing color under a predetermined heat sterilization condition, confirming completion of the retort processing based on comparison of the color of the heat-sensitive ink between before and after sterilization, and reading the production data by irradiating the can with excitation light (see the patent literature 2).

Furthermore, as a technique of confirming completion of the retort processing by detecting a temperature change by using a bimetal, there have been proposed a technique of confirming completion of the retort processing by obtaining the temperature history by using a temperature history sensor that incorporates a heat-sensitive member that is displaced by two kinds of bimetals that move in response to a temperature change (see the patent literature 3) and a sterilization checking apparatus that automatically detects a positional change of a thermo checker that is activated by movement of a bimetal in response to a temperature change and checks and confirms the status of sterilization of the container in which drink is sealed (see the patent literature 4).

Furthermore, as a technique that involves installation of a heat processing completion confirming system, there has been proposed a heat processing completion confirming system for a heat processing process that involves installing a sensor capable of retaining the processing temperature history on a holder near the retort processing apparatus in the production line through which the product to be subjected to the retort processing is carried and checking the heating history with a storage and display unit covering the sensor (see the patent literature 5).

Of the various types of techniques, the technique that uses a heat-sensitive ink material capable of changing or losing color at the high temperature of the retort processing requires a special and relatively expensive heat-sensitive ink, a printing apparatus and a printing step, and the printed ink can peel. Furthermore, although it is possible to confirm that the temperature of the retort processing is reached, it is not always possible to confirm whether the retort processing is adequately performed.

The technique of confirming completion of the retort processing by detecting a temperature change by using a bimetal requires a temperature history sensor incorporating a special heat-sensitive member or a sterilization checking apparatus that detects a positional change of a thermo checker activated by movement of the bimetal, and thus, the cost of equipment for the production process is significantly high.

Furthermore, the technique that involves installation of a heat processing checking system for a heat processing process requires installation of a particularly expensive special heat processing completion confirming system provided with a sensor capable of retaining the processing temperature history and a storage and display unit, although it is possible to confirm that the retort processing is adequately performed.

Any of the conventional techniques described above are a method or apparatus for confirming completion of the retort processing developed from the viewpoint of the producer. Only in the patent literature 2, a slight mention is made of confirmation of completion of the retort processing by the consumer (Abstract and Paragraph 0007). However, the confirmation of completion of the retort processing based on comparison of the color of the fluorescent heat-sensitive ink is not always an easy and simple confirmation method for the consumer, and the consumer cannot confirm whether the retort processing is adequately performed.

Recently, as a container for which the producer and the consumer can easily confirm completion of the retort processing of the product, there has been proposed a bottle for food made of polyethylene terephthalate resin formed by biaxial stretch blow molding, the bottle having a part that is not stretched at the center part of the bottom part thereof that is whitened by crystallization caused by a heating processing, such as the retort processing, after filling with the content. According to this production process supervising method, whitening of the center part of the bottom part of the bottle due to crystallization caused by the heating processing is used as an indicator for confirming completion of the heating processing of the product (see the patent literature 6). However, the bottle for food made of polyethylene terephthalate resin probably cannot resist the high temperature of the retort processing for a long time, so that this technique is not always easy to put to practical use.

Patent literature 1: Japanese Patent Laid-Open No. 2003-334897 (Abstract)
Patent literature 2: Japanese Patent Laid-Open No. 2004-203464 (Abstract and Paragraph 0007)
Patent literature 3: Japanese Patent Laid-Open No. 2003-344174 (Abstract)
Patent literature 4: Japanese Patent Laid-Open No. 2002-104336 (Abstract and Paragraphs 0016 and 0020)
Patent literature 5: Japanese Patent Laid-Open No. 2002-142736 (Abstract)
Patent literature 6: Japanese Patent Laid-Open No. 2005-313932 (Abstract and Claims)

DISCLOSURE OF THE INVENTION

As described above in the paragraphs 0002 to 0006 in Background Art, although the retort processing of cans and plastic containers in which food or drink is packed is an important step in the production process, confirmation and supervision of completion of the retort processing is a heavy work burden on the production operator, and perfect confirmation and supervision are difficult, so that various kinds of methods and apparatuses for ensuring perfect confirmation and supervision of completion of the retort processing have been proposed. However, those conventional techniques still have problems that (i) whether the retort processing is adequately performed cannot always be confirmed, although it is possible to confirm that the temperature of the retort processing is reached, (ii) a temperature history sensor incorporating a special heat-sensitive member is required, or installation of a heat processing completion confirming system provided with a thermo checker reader, a temperature history obtaining sensor or the like is required, so that the cost of equipment of the production line is high, and (iii) the consumer cannot confirm completion of the retort processing, for example.

An object of the present invention is to solve the problems and provide a method of confirming completion of a retort processing that allows confirmation and supervision of completion of a retort processing with simple means without the need of an expensive member or facility, such as a special sensor or a confirming system, in particular, allows confirmation of whether the retort processing is performed in a predetermined manner rather than simply providing a retort processing temperature history, and allows a consumer to easily confirm whether the retort processing of a commercial product is completed or not.

In order to attain the object of the present invention and provide the retort processing confirming method described above, the inventors have aimed to develop a retort processing confirming method for a plastic container, represented by a polyester resin container, such as a PET bottle, the demand for which has recently been dramatically increasing. In the search of a novel confirming method, in addition to the various conventional retort processing confirming methods described above, the inventors searched for and investigated various conventional techniques including commonly used temperature history obtaining methods, heating processing detecting systems, polyester resin materials to be subjected to the retort processing, and stretch blow molding processes used in container production.

In the process, an idea occurred to the inventors that if an indicator for confirming completion of the retort processing is provided on the plastic container itself, completion of the retort processing can be confirmed and supervised with simple means without the need of any expensive facility. And the inventors realized that the phenomenon of whitening of the part that is not stretched or is insufficiently stretched in the stretch blow molding of the polyester resin container caused by post heating, which is disclosed in the patent literature 6 described above, can be suitably used as an indicator of the heating history, and studied the practicability and commercial applicability of a polyester resin container formed by biaxial stretch blow molding that has the part that is not stretched at the center of the bottom part of the container whitened by crystallization caused by the retort processing after packing of food or drink.

However, it turned out that the container for food or drink made of polyester resin formed by biaxial stretch blow molding that has the part that is not stretched at the center part of the bottom part whitened by crystallization caused by the retort processing disclosed in the patent literature 6 cannot resist the high temperature of the retort processing for a long time and thus is not easy to put to practical use.

The patent literature 6 discloses a method of forming a bottle by one-stage blow molding that involves stretching a polyethylene terephthalate preform held between a stretching rod and a supporting pin (a pressing rod) by moving the stretching rod forward and moving the supporting pin backward while forming a transparent thick part that is not stretched at the center part of the bottom part. And it is described that, when the container in which the content is packed and sealed is subjected to the retort processing, the transparent thick part at the center part of the bottom part of the bottle is whitened, and thus, whether the retort processing is performed or not can be confirmed (see the paragraphs 0006, 0007 and 0032 and FIG. 3 of the patent literature 6).

However, the one-stage blow molding method described in the patent literature cannot provide a container that has a sufficient heat resistance for the retort processing. Thus, since the container does not have a sufficient retort processing resistance, the product using the container cannot be put to practical use.

Besides, if a conventional two-stage blow molding method is used to form a heat-resistant container having a transparent thick part on the bottom thereof to achieve a retort processing resistance, the transparent thick part is heated to a temperature enough to be whitened during reheating for causing heat shrinkage of the intermediate body after the primary blowing and thus is prematurely whitened when slowly cooled after the secondary blowing. Thus, the intended confirmation of completion of the retort processing cannot be achieved (whereas the preform is heated to a relatively low temperature of about 100 degrees C. in the one-stage blow molding, the temperature during the heat shrinkage before the secondary blowing is a high temperature of about 200 degrees C., so that the transparent thick part is whitened when slowly cooled).

In view of the recognized important problems of the conventional techniques, the inventors continued investigating and experimenting polyester resin materials, stretch blow molding processes for container production and the like in order to provide a heat-resistant polyester resin container for food or drink capable of resisting the high temperature of the retort processing for a long time that is formed by biaxial stretch blow molding and whose part that is not stretched formed at the center part of the bottom part is whitened by crystallization caused by the retort processing.

Thus, the inventors devised an important novel method that attains the object of confirming completion of the retort processing by whitening the part that is not stretched formed at the center part of the bottom part of the container during the retort processing rather than during the slow cooling after the secondary blowing in the two-stage blow molding. According to this method, a part of a plastic container made of polyester resin or the like is not stretched or is insufficiently stretched in the two-stage stretch blow molding, and the part is rapidly cooled. In this case, the part is whitened by post heating. Thus, the part is whitened when heated in the retort processing to form a retort processing completion confirming part.

Thus, according to the novel method of the present invention, there is provided a thermoplastic resin container having a high heat resistance formed by two-stage blow molding, and the thermoplastic resin container has a retort processing completion confirming part that is whitened by heating in a retort processing after a stretching processing and allows confirmation of completion of a retort processing.

To obscure the whitened part on the product, for example, the retort processing completion confirming part is preferably formed on the bottom part of the container and, in particular, is formed in a circular shape at the center part of the bottom part of the container. Alternatively, along the whitened nozzle part (neck part of the container) that is not stretched and thus is thermally crystallized to have a heat resistance, the retort processing completion confirming part can be formed in substantially a tubular shape at a base part of the nozzle. Alternatively, the whitened part can be formed both on the bottom part and at the base part of the nozzle or formed at any other part.

According to a method of forming the whitened part, the whitened part, or in other words the retort processing completion confirming part, is formed by forming a container having a high heat resistance by using a two-stage blow molding method for stretch blowing of a preform made of a thermoplastic resin to perform stretch blowing in such a manner that a part of the preform is not stretched or is insufficiently stretched, and whitening the part that is not stretched or is insufficiently stretched by heating in a retort processing after the content is packed and sealed in the container.

More specifically, for example, preferably, the retort processing completion confirming part is formed by forming an intermediate body by performing biaxial stretch blow molding of a preform made of thermoplastic resin in such a manner that a part that is not stretched or is insufficiently stretched is formed, causing heat shrinkage of the intermediate body, performing secondary blow molding to form a container having a transparent or translucent thick part by performing stretch blowing of the intermediate body by longitudinally stretching the intermediate body with a stretching rod having the bottom surface of the tip end cooled so that the center part of the bottom part of the container is not stretched or is insufficiently stretched because of rapid cooling, by performing blowing of the intermediate body by holding the bottom part of the intermediate body between the stretching rod and a supporting pin having the upper surface cooled so that the center part of the bottom part of the container is not stretched or is insufficiently stretched because of rapid cooling, or performing blow molding by rapidly cooling a thick part that is not stretched or is insufficiently stretched at the base part of the nozzle by holding the part between cooled parts of a blow mold, and then whitening the transparent or translucent part that is not stretched or is insufficiently stretched by heating in a retort processing after the content is packed and sealed in the container.

Note that the method of forming a part that is not stretched or is insufficiently stretched because of rapid cooling at the center part of the bottom part of the container and the method of forming a part that is not stretched or is insufficiently stretched because of rapid cooling at the base part of the nozzle can be used in combination.

The present invention configured as described above is a novel invention that allows retort processing completion confirming means based on whitening of a part that is not stretched to be put to practical use and commercialized and is applied to a two-stage blow-molded container having a high retort processing resistance as a primary requirement. According to the present invention, whether a plastic container product containing food or drink is subjected to a retort processing or not can be simply and reliably confirmed based on the presence or absence of the whitened part on the bottom part of the container and/or the base part of the nozzle of the container, which is formed by heating in the retort processing.

Thus, the present invention provides a two-stage blow-molded container having a high retort processing resistance that has comprehensive advantages over the conventional techniques that (i) completion of the retort processing can be confirmed and supervised with simple means without the need of an expensive member or facility for obtaining the heating history, (ii) the production operator can reliably confirm and perfectly supervise completion of the retort processing in the production process of a plastic container for food or drink without an additional work burden or wrong confirmation, (iii) the whitened part is not formed simply by experiencing the temperature of the retort processing but formed by being subjected to the retort processing at a predetermined temperature for a predetermined length of time, so that whether the retort processing is adequately performed or not, rather than whether the temperature of the retort processing is reached or not, can be reliably confirmed, (iv) a preliminary processing for formation of the whitened part can be performed during plastic stretch blow molding, so that any additional step is not required, (v) not only the producer but also the consumer can confirm completion of the retort processing, and (vi) the confirmation method, which is based on the presence or absence of the whitened part, is easy and convenient for the consumer, and the consumer can confirm that the food or drink packed in the container is preserved well and has not changed the flavor and can feel safe about the hygiene of the food or drink even when the food or drink is for infants.

In the patent literatures listed in the paragraph 0008 in Background Art other than the patent literature 6 that has been referred to as a conventional technique and other relevant patent literatures, any of the constituent elements and features of the present invention described in the paragraphs 0013 to 0016 cannot be found even by the closest investigation. Thus, it can be considered that the present invention is distinctly different from any conventional techniques including the technique described in the patent literature 6 and thus is an excellent invention that cannot be suggested by the conventional techniques.

The background of the development of the present invention and basic constituent elements and features of the present invention have been schematically described so far. Summarizing the present invention, the present invention comprises the following aspects. The aspects [1] and [8] are basic aspects of the present invention, and the remaining aspects are intended to make the basic aspects more specific or to provide more implementations of the basic aspects (the aspects of the present invention are collectively referred to as "the present invention").

[1] A thermoplastic resin container for which completion of a retort processing can be confirmed, characterized in that the thermoplastic resin container is made from a thermoplastic resin by two-stage blow molding and has a retort processing completion confirming part formed by a whitened part, which is produced by heating in a retort processing after a stretching processing.

[2] The thermoplastic resin container for which completion of a retort processing can be confirmed described in [1], characterized in that the retort processing completion confirming part formed by the whitened part is formed on a bottom part of the container.

[3] The thermoplastic resin container for which completion of a retort processing can be confirmed described in [2], characterized in that the retort processing completion confirming part formed by the whitened part is formed in a circular shape at a center part of the bottom part of the container.

[4] The thermoplastic resin container for which completion of a retort processing can be confirmed described in [1], characterized in that the retort processing completion confirming part formed by the whitened part is formed at a base part of a nozzle of the container.

[5] The thermoplastic resin container for which completion of a retort processing can be confirmed according to any of [1] to [4], characterized in that the thermoplastic resin is polyester resin.

[6] The thermoplastic resin container for which completion of a retort processing can be confirmed according to any of [1] to [5], characterized in that the thermoplastic resin container is a retort-processing-ready polyester resin container capable of being subjected to retort sterilization at 105 degrees C. or higher for 1 to 50 minutes.

[7] A thermoplastic resin container, characterized in that the thermoplastic resin container is formed by forming an intermediate body by stretch blow molding of a preform made of a thermoplastic resin, heating the intermediate body to cause heat shrinkage, and then performing secondary stretch blow molding of the intermediate body in such a manner that a transparent or translucent part that is not stretched or is insufficiently stretched rapidly cooled is formed at a part of the intermediate body.

[8] A method for producing a thermoplastic resin container for which completion of a retort processing can be confirmed, characterized in that an intermediate body is formed by stretch blow molding of a preform made of a thermoplastic resin, the intermediate body is heated to cause heat shrinkage, the container is formed by performing secondary stretch blow molding of the intermediate body in such a manner that a transparent or translucent part that is not stretched or is insufficiently stretched rapidly cooled is formed at a part of the intermediate body, a content is packed and sealed in the container, and then, the part that is not stretched or is insufficiently stretched is turned into a whitened part by heating in a retort processing to form a retort processing completion confirming part.

[9] The method for producing a thermoplastic resin container for which completion of a retort processing can be confirmed described in [8], characterized in that the intermediate body is formed by biaxial stretch blow molding of the preform made of a thermoplastic resin in such a manner that the part that is not stretched or is insufficiently stretched is formed at a bottom of the intermediate body, the intermediate body is heated to cause heat shrinkage, the container is formed by performing secondary stretch blow molding of the intermediate body by longitudinally stretching the intermediate body with a stretching rod whose bottom surface of the tip end is cooled so that the part that is not stretched or is insufficiently stretched rapidly cooled is formed at a center part of a bottom part of the container, the content is packed and sealed in the container, and then, the part that is not stretched or is insufficiently stretched is turned into the whitened part by heating in the retort processing to form the retort processing completion confirming part.

[10] The method for producing a thermoplastic resin container for which completion of a retort processing can be confirmed described in [9], characterized in that the intermediate body is formed by biaxial stretch blow molding of the preform made of a thermoplastic resin in such a manner that the part that is not stretched or is insufficiently stretched is formed at the bottom of the intermediate body, the intermediate body is heated to cause heat shrinkage, the container is formed by performing secondary stretch blow molding of the intermediate body by holding the bottom of the intermediate body between the stretching rod whose bottom surface of the tip end is cooled and a supporting pin whose upper surface is cooled so that the part that is not stretched or is insufficiently stretched rapidly cooled is formed at the center part of the bottom part of the container, the content is packed and sealed in the container, and then, the part that is not stretched or is insufficiently stretched is turned into the whitened part by heating in the retort processing to form the retort processing completion confirming part.

[11] The method for producing a thermoplastic resin container for which completion of a retort processing can be confirmed described in [8], characterized in that the intermediate body is formed by biaxial stretch blow molding of the preform made of a thermoplastic resin in such a manner that the part that is not stretched or is insufficiently stretched is formed at a base part of a nozzle, the intermediate body is heated to cause heat shrinkage, secondary stretch blow molding of the intermediate body is performed by rapidly cooling the thick part that is not stretched or is insufficiently stretched formed at the base part of the nozzle by holding the part between cooled parts of a blow mold, the content is packed and sealed in the container, and then, the part that is not stretched or is insufficiently stretched is turned into the whitened part by heating in the retort processing to form the retort processing completion confirming part.

[12] A heat-resistant thermoplastic resin container that is formed by two-stage blow molding and for which completion of a retort processing can be confirmed after a food or drink is packed in the container, characterized in that a retort processing completion confirming part is formed on the container by turning a part that is not stretched or is insufficiently stretched into a whitened part by heating in the retort processing performed after a content is packed and sealed in the container.

EFFECT OF THE INVENTION

A two-stage blow-molded container having high retort resistance according to the present invention has considerable advantages that completion of a retort processing can be confirmed and supervised with simple means without the need of an expensive member or facility to obtain the heating history, the production operator can reliably confirm and perfectly supervise completion of the retort processing in the production process for the plastic container product containing food or drink without an additional work burden or wrong confirmation, whether the retort processing is adequately performed, rather than whether the temperature of the retort processing is reached, can be confirmed, and not only the producer but also the consumer can confirm completion of the retort processing by an easy and simple confirming method.

DESCRIPTION OF SYMBOLS (a-1): nozzle part
(b-1): base part of nozzle
(b-2): center part of bottom part
(f-1): whitened base part of nozzle
(f-2): whitened center part of bottom part
(2-1): mold
(2-2): stretching rod
(2-3): supporting pin
(2-4): Cooling block
(2-5): cooling block
(2-6): cooling block
(2-7): blow nozzle
(2-8): heat insulator
(2-9): heat insulator
(2-10): bottom mold

BEST MODE FOR CARRYING OUT THE INVENTION

The present invention has been outlined concerning basic configurations thereof as means for solving the problems. However, in the following, embodiments of the present invention outlined above will be described in detail with reference to the drawings.

1. Thermoplastic Resin Container for Which Completion of Retort Processing can be Confirmed (1) Basic Configuration A thermoplastic resin container for which completion of a retort processing can be confirmed according to the present invention is a two-stage blow-molded container having a high retort resistance, which is made of a thermoplastic resin and has a retort processing completion confirming part formed by a whitened part resulting from heating in a retort processing after a stretch processing.

(2) Formation of Whitened Part

A transparent part of the thermoplastic resin container that is not stretched or is insufficiently stretched in the stretch blow molding is whitened by subsequent heating. By using the phenomenon to indicate the heating history, the plastic container itself can be directly provided with an indication that the retort processing is completed. More specifically, if a part of a plastic container made of polyester resin or the like is rapidly cooled to leave a transparent or translucent thick part that is not stretched or is insufficiently stretched during the two-stage blow molding of the container, the part will be whitened by subsequent heating. Thus, the part is whitened by heating in the retort processing to form the retort processing completion confirming part.

(3) Location of Whitened Part

The whitened part can be formed at any location of the container. However, to obscure the whitened part of the product or facilitate formation with a cooling stretching rod, the whitened part is preferably formed on the bottom part of the container. In particular, the whitened part is formed at the center of the bottom part of the container and has a circular shape as shown in FIG. 1(f).

Typically, a neck part (a base part of a nozzle) of the container is not stretched in the stretch blow molding, so that the neck part can be a whitened confirming part.

The part that is not stretched or is insufficiently stretched has a reduced mechanical strength. However, the part is thickened, stuffed with a resin by the stretching rod or thermally fixated by post-heating of the retort processing to add the mechanical strength.

2. Retort Processing

In general, the retort processing is a heating sterilization processing carried out under pressure at a temperature close to 100 degrees C., or equal to or higher than 100 degrees C. and equal to or lower than about 125 degrees C., for several to several tens of minutes. A heating autoclave is used for the heating processing, and heated stream or boiling water is typically used as a heating medium.

On the production line, containers in which the food or drink is packed are processed in succession, or collected in baskets and processed in batches.

Specifically, for example, under conditions for the retort processing, under the isobaric control using hot water shower, the retort processing is started at a liquid temperature of 20 degrees C., the liquid temperature is raised to 125 degrees C. and the pressure in the retort autoclave is raised to 245 Kpa in 20 minutes (by time proportional control), the retort processing is performed for 30 minutes, and then the liquid temperature is lowered to 20 degrees C. and the pressure in the retort autoclave is lowered to the atmospheric pressure in 20 minutes.

According to the present invention, in general, the requirements for the retort processing can be met if the heating processing is performed at a temperature equal to or higher than 105 degrees C. for 5 minutes or longer.

3. Retort-Resistant Container

The thermoplastic resin container for which completion of a retort processing can be confirmed according to the present invention has to be a retort-resistant container whose deformation or shrinkage is minimized even under strict conditions of the retort processing performed at high temperature for a long time. In this regard, the thermoplastic resin container according to the present invention intrinsically differs from the prior art disclosed in the patent literature 6 described above.

Essentially, such a highly heat-resistant retort-resistant container can be produced by two-stage blow molding (which is also known as "double blow method").

The applicant of this application has previously filed applications concerning inventions of retort-resistant thermoplastic resin containers. The applications are based on the invention primarily concerning two-stage biaxial stretch blow molding and provide retort-resistant containers that are improved in multiple points including the conditions, the structure of the mold, the heat processing method for the molded article and the preform material in the two-stage biaxial stretch blow molding, the heat shrinkage processing of the primary molded article, and the heat setting processing after the secondary blowing (Japanese Patent Application No. 2004-378384 (Japanese Patent Laid-Open No. 2006-181884) and Japanese Patent Application No. 2005-131624, for example).

Therefore, for example, the retort-resistant container according to the present invention can be the "retort-processing-ready polyester container produced by forming a primary molded article from a preform made of polyester resin in a primary mold by biaxial stretch blow molding, forming a secondary molded article by shrinking the primary molded article by heating, performing biaxial stretch blow molding of the secondary molded article in a surface-treated secondary mold, and heat-setting the resulting blow-molded article in the secondary mold by heating the surface of the blow-molded article to a temperature higher than 210 degrees C. and equal to or lower than 250 degrees C., in which the percentage of thickness reduction of the trunk of the container due to the biaxial stretch blow molding in the secondary mold is 5 to 30%, the volume of shrinkage of the container after processing in the autoclave at 125 degrees C. for 30 minutes is equal to or lower than 1%, and the temperature at which the shrinkage of the container in the circumferential direction begins, which is measured by thermal-mechanical analysis (TMA), is equal to or higher than 120 degrees C., and for which retort sterilization at 125 degrees C. can be performed for 1 to 50 minutes" according to the prior application.

4. Production of Thermoplastic Resin Container for Which Completion of Retort Processing can be Confirmed The thermoplastic resin container for which completion of a retort processing can be confirmed can be produced by leaving a transparent part that is not stretched or is insufficiently stretched in the stretch blow molding of the heat-resistant plastic container, and whitening the part by heating in the retort processing to form the retort processing completion confirming part.

That is, when the heat resistant container is shaped by stretch blow molding of a preform made of a thermoplastic resin, such as polyester resin, the stretch blow molding is performed in such a manner that a part of the preform is not stretched or is insufficiently stretched, and the part that is not stretched or is insufficiently stretched is whitened by heating in the retort processing performed after the content is packed and sealed in the container, thereby forming the retort processing completion confirming part.

More specifically, an intermediate body is formed by performing biaxial stretch primary blow molding of a preform made of a thermoplastic resin in such a manner that a transparent or translucent thick part that is not stretched or is insufficiently stretched is formed at the bottom of the intermediate body or the base part of the nozzle thereof. The part that is not stretched or is insufficiently stretched at the bottom is formed by blowing by holding the bottom part between the stretching rod and a supporting pin. On the other hand, the base part of the nozzle is not stretched in the blowing, and thus, the part that is not stretched is formed there.

The intermediate body is heated to cause heat shrinkage and then molded into a container by performing biaxial stretch secondary blow molding by longitudinally stretching the intermediate body in such a manner that a part that is not stretched or is insufficiently stretched rapidly cooled is formed at the center part of the bottom part of the container or the base part of the nozzle. Then, after the content is packed and sealed in the container, the part that is not stretched or is insufficiently stretched is whitened by heating in the retort processing.

The production process is illustrated in the schematic diagrams of FIGS. 1(a) to 1(f). FIG. 1(a) shows a preform (primary intermediate body) only a nozzle part (a-1) of which is previously crystallized and whitened. FIG. 1(b) shows a secondary intermediate body formed by primary blowing of the preform, the base part (b-1) of the nozzle of which forms a transparent or translucent thick part, and the center part (b-2) of the bottom of the secondary intermediate body also forms a transparent or translucent thick part. FIG. 1(c) shows a tertiary intermediate body formed by heat shrinkage of the secondary intermediate body. FIG. 1(d) shows a container molded by secondary blowing of the tertiary intermediate body, the base part of the nozzle of which is rapidly cooled in a mold cooling block to become transparent or translucent, and the center part of the bottom of which is rapidly cooled by the stretching rod and/or the supporting pin to become transparent or translucent. FIG. 1(e) shows the molded container filled with a food or drink and capped. FIG. 1(f) shows the container filled with the food or drink and subjected to the retort processing, the base part (f-1) of the nozzle and the center part (f-2) of the bottom of the container are whitened by high-temperature heating in the retort processing to form a retort processing completion confirming part.

In a preferred specific example, the retort processing completion confirming part can be formed by forming the container by biaxial stretch blow molding of the preform made of a thermoplastic resin in such a manner that a part that is not stretched or is insufficiently stretched is formed at the center part of the bottom part of the container by longitudinally stretching the preform with the stretching rod having the bottom surface of the tip end cooled in the secondary blowing after heat shrinkage after the primary blowing, and whitening the part that is not stretched or is insufficiently stretched by heating in the retort processing after the content is packed and sealed in the container.

In this case, when the secondary blow molding of the intermediate body is performed to form the container, the bottom part of the tertiary intermediate body is held between the stretching rod with the bottom surface cooled and the supporting pin with the upper surface cooled so that the center of the bottom part of the container is rapidly cooled to form a part that is not stretched or is insufficiently stretched. The rapidly cooled part can maintain the transparent or translucent state.

Alternatively, the retort processing completion confirming part can be formed by forming an intermediate body by biaxial stretch blow molding of the preform made of a thermoplastic resin in such a manner that a part that is not stretched or is insufficiently stretched is formed at the base part of the nozzle, heating the intermediate body to cause heat shrinkage, performing secondary blow molding of the intermediate body by rapidly cooling the thick part that is not stretched or is insufficiently stretched formed at the base part of the nozzle by holding the part between cooled parts of the blow mold, and whitening the part that is not stretched or is insufficiently stretched by heating in the retort processing after the content is packed and sealed in the container.

Alternatively, the method of forming the part that is not stretched or is insufficiently stretched at the center part of the bottom part by rapid cooling described in the paragraph 0033 and the method of forming the part that is not stretched or is insufficiently stretched at the base part of the nozzle of the container by rapid cooling can be used in combination.

Figure 2:
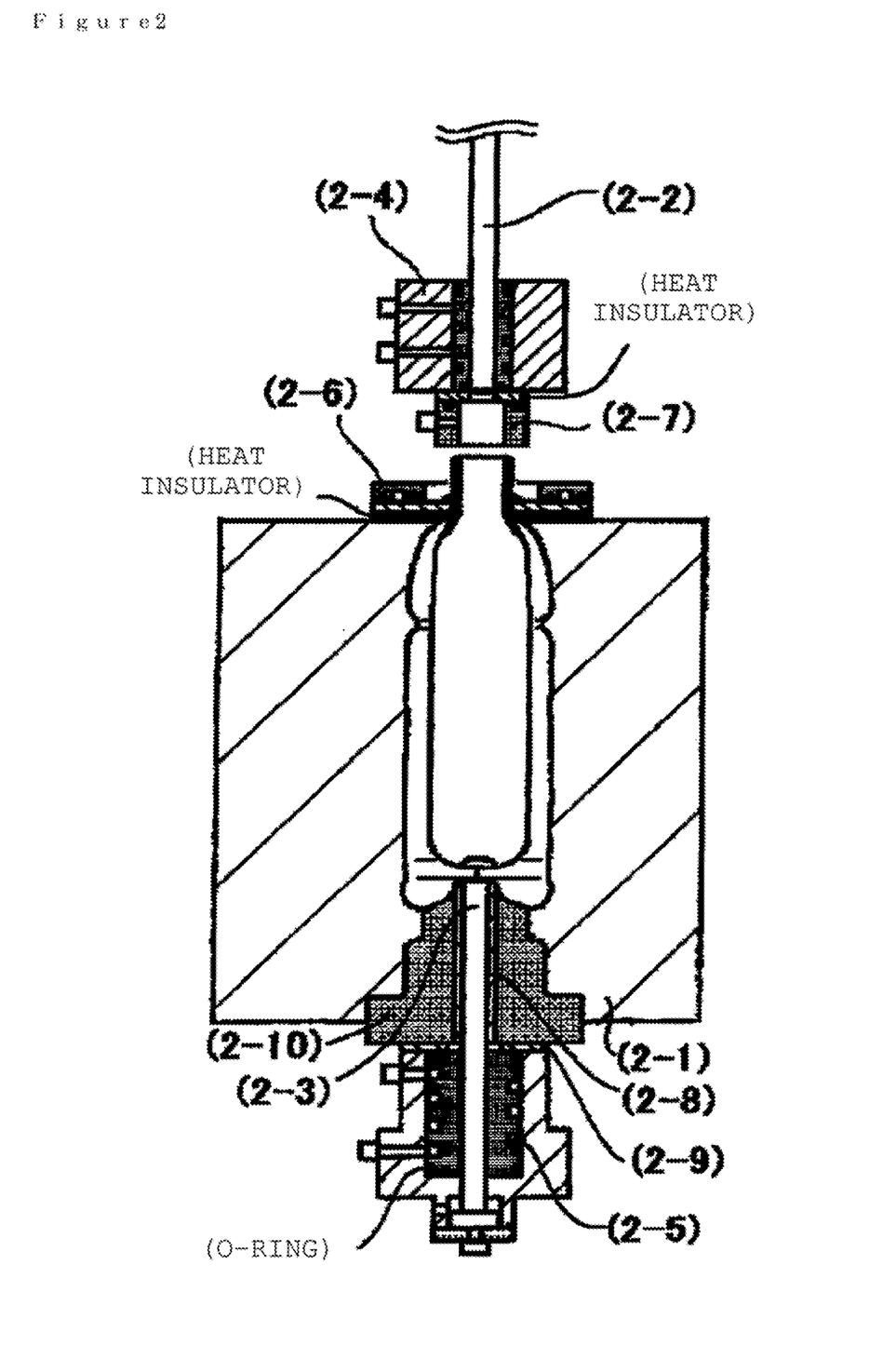
FIG. 2 is a cross-sectional view showing an example for illustrating blow molding of a tertiary intermediate body in a mold according to the present invention.
Figure 3:
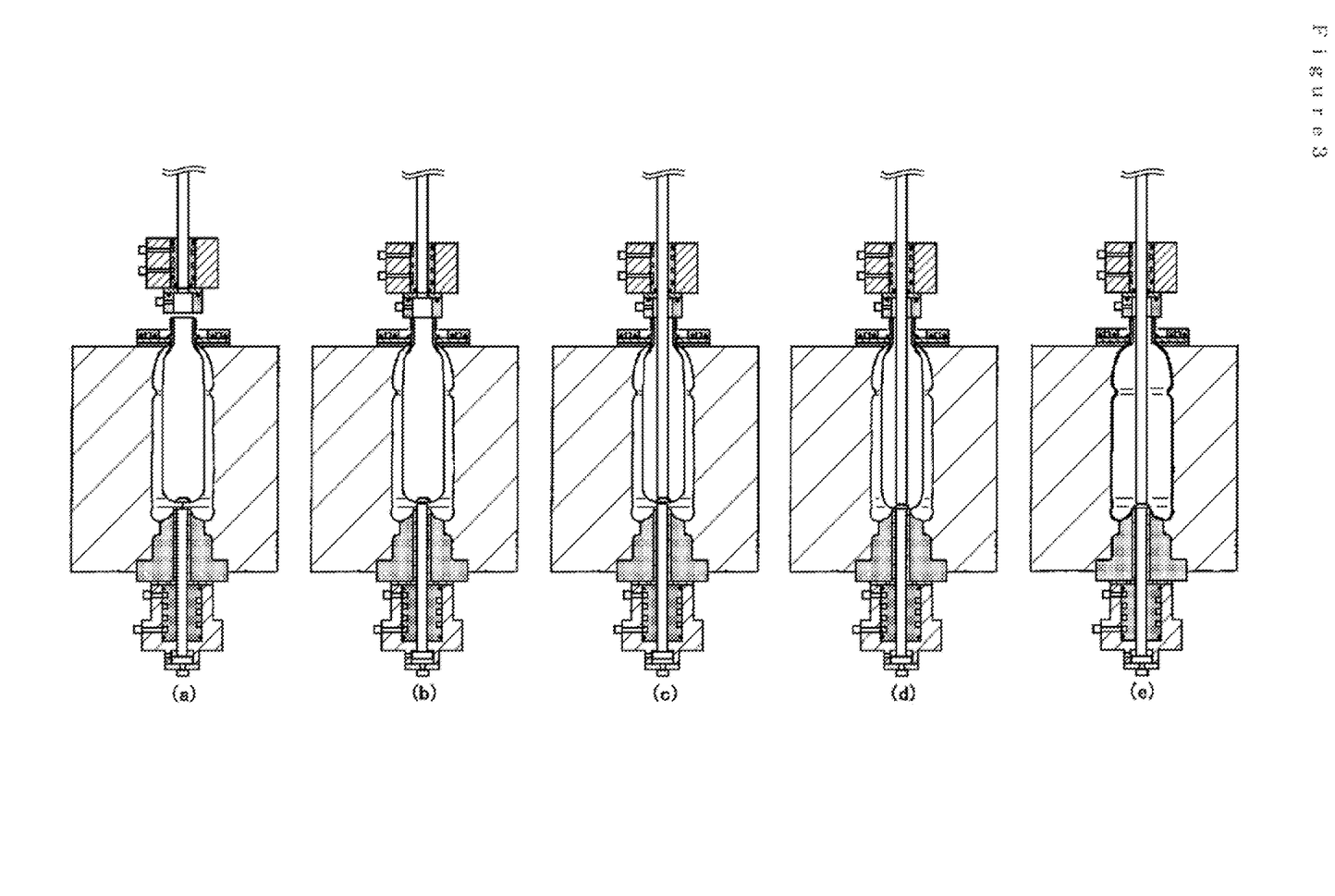
FIG. 3 includes cross-sectional views for illustrating secondary blow molding of a heat-shrunk intermediate body according to the present invention in time sequence.

FIGS. 2 and 3 illustrate such secondary blow molding and a molding apparatus used therefor. FIG. 2 illustrates blow molding of the tertiary intermediate body in a mold (2-1). A stretching rod (2-2) and a supporting pin (2-3) are previously cooled in cooling blocks (2-4) and (2-5), respectively, the base part of the nozzle of the tertiary intermediate body is cooled in a cooling block (2-6), and cooling water is circulated in each cooling block. The supporting pin is cooled at the bottom thereof. However, the tip end of the supporting pin is also cooled because of heat conduction, and the thermal effect of the mold (2-1) and a bottom mold (2-10) on the supporting pin is reduced by heat insulators (2-8) and (2-9). The secondary blow molding is performed by blowing high-pressure air into the tertiary intermediate body through a blow nozzle (2-7).

FIGS. 3(a) to 3(e) illustrate secondary blowing of the heat-shrunk intermediate body in time sequence. In FIG. 3(a), the tertiary intermediate body is inserted in the mold, and the base part of the nozzle is rapidly cooled by the cooling block. In FIG. 3(b), the blow nozzle is lowered, and the supporting pin is raised. In FIG. 3(c), the stretching rod is lowered, and the center part of the bottom part of the tertiary intermediate body is rapidly cooled by the rods (i.e. the stretch rod and the supporting pin, or pressing rod). In FIG. 3(d), the stretching rod is further lowered to push the supporting pin down to a bottom dead center. In FIG. 3(e), high-pressure air is blown into the tertiary intermediate body through the blow nozzle to achieve the secondary blow molding.

As described above and shown in FIG. 2, cooling of the bottom part by the stretching rod is achieved by cooling the lower part of the stretching rod and the upper part of the supporting pin held in the mold of in the biaxial stretch blow molding apparatus by the cooling blocks containing cooling water circulating therein.

Alternatively, cooling of the bottom part by the stretching rod can be achieved by intensively cooling the bottom part the stretching rod by circulating cooling water or cooling air in a predetermined bottom part of the stretching rod having a shape corresponding to the shape of the bottom part of the container. Such a cooling rod can be the device schematically shown in the drawing in the abstract of Japanese Patent Laid-Open No. 2000-343590.

5. Material of Thermoplastic Resin Container (1) Thermoplastic Resin

The material of the plastic container according to the present invention can be thermoplastic resin, such as polyester resin, polyamide resin, polyolefin resin and polycarbonate resin. However, from the viewpoints of the properties as a container and the price, polyester resin is preferably used. In particular, polyethylene terephthalate (PET) is preferably used.

Among other polyethylene terephthalate polyester resins, thermoplastic polyester resins in which most part, typically 70 mole percent or more, preferably 80 mole percent or more, of the ester repeating units consists of ethylene terephthalate units, are preferably used. In addition, any polyester resin that is susceptible to biaxial stretch blow molding and can be crystallized can be used, and polyester resins, such as polybutylene terephthalate, polyethylene naphthalate and polylactic acid, or mixtures of such polyester resins and polycarbonates or acrylate resins can also be used.

(2) Laminate Material

A laminate of polyethylene terephthalate or the like and another resin can also be used. Furthermore, the polyester resin container according to the present invention can have a multilayer structure composed of an outer and an inner polyester resin layer and an intermediate oxygen insulating or oxygen absorbing layer. The oxygen insulation and oxygen absorption increases the resistance of the packed food or drink against microbial decay or chemical change.

The thermoplastic resin forming the oxygen insulating layer can be ethylene-vinylalcohol copolymer or polyamide, for example.

The oxygen absorbing layer can be a layer of a resin blended with an oxygen absorber. The oxygen absorber can be reductive metal powder, for example.

(3) Preform

The preform is formed by common means, such as an injection molding machine, an extruder and a compression molding machine. The material of the preform is preferably polyethylene terephthalate (PET) as described above. A laminate preform can also be used appropriately.

6. Thermoplastic Resin Container Product for Which Completion of Retort Processing can be Confirmed (1) Product Containing Food or Drink The present invention includes, as an implementation, a thermoplastic resin container containing food or drink for which completion of a retort processing can be confirmed, characterized in that a retort processing completion confirming part is formed at the center of the bottom part of the container or the like by whitening a part that is not stretched or is insufficiently stretched by heating in the retort processing after packing and sealing the food or drink in the container.

(2) Packed Food or Drink

Any ordinary food or drink can be packed in the container without any limitations. For example, drinks, such as milk coffee, cocoa, milk tea and green tea, soups, various cooked foods, or foods prepared for infants are preferably packed.

EXAMPLE

In the following, a specific example of the present invention will be described. However, the following description is intended to show a preferred specific example of the present invention, facilitate clear understanding of the present invention, and expand the applicability of the present invention.

[Description of Example with Reference to Drawings]

Figure 1:
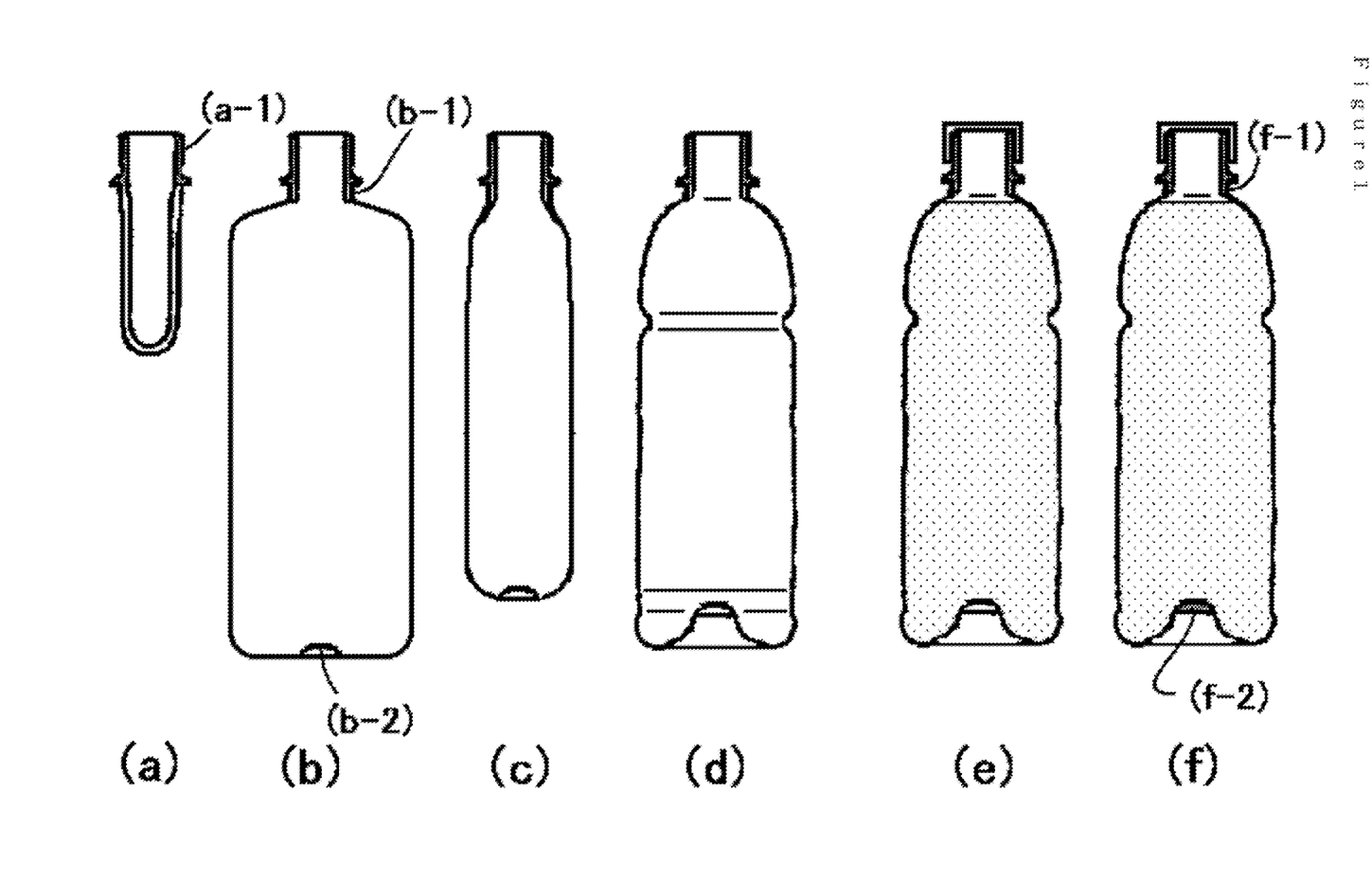
FIG. 1 includes schematic diagrams for illustrating a process of producing a thermoplastic resin container for which completion of a retort processing can be confirmed according to the present invention.

Detailed description of an example with reference to FIGS. 1 to 3 has been provided in the paragraphs 0032, 0035 and 0036.

[Description of Example Using Biaxial Two-Stage Blow Molding]

The spout part (nozzle part) of the preform (primary intermediate body) made of polyethylene terephthalate is previously crystallized (whitened) by heating means. Then, the preform is heated to 110 degrees C., which is a temperature equal to or higher than the glass transition point, and is subjected to biaxial stretch blow molding in a blow mold at a temperature of 160 degrees C. to stretch the preform longitudinally to three times the original length thereof and laterally to three times the original width thereof, thereby forming the secondary intermediate body having transparent or translucent thick parts that are not stretched or are insufficiently stretched at the base part of the nozzle and the center part of the bottom part.

The secondary intermediate body is heated again to raise the surface temperature of 210 degrees C., thereby causing heat shrinkage to form the tertiary intermediate body. The tertiary intermediate body is directly subjected to blow molding in the secondary blow mold having a container shaping surface coated with PFA fluororesin kept at a temperature of 230 degrees C. In the blow molding, the tertiary intermediate body is stretched longitudinally with the part of the tertiary intermediate body corresponding to the base part of the nozzle held in the secondary blow mold cooled to 15 degrees C. and with the bottom part thereof held between the stretching rod having the bottom surface of the tip end cooled to 15 degrees C. and the supporting pin having the upper surface cooled to 15 degrees C., thereby forming a transparent or translucent part that is not stretched or is insufficiently stretched at the base part of the nozzle of the container and the center part of the bottom part of the container.

[Retort Processing]

After food or drink is packed and sealed in the container molded as described above, the retort processing is performed at 105 degrees C. for 5 minutes to whiten the part that is not stretched or is insufficiently stretched, thereby forming the retort processing completion confirming part.

Note that the present invention is not limited to this example, and the transparent or translucent thick part can be formed only one of the base part of the nozzle and the center part of the bottom part. In the case where the transparent or translucent thick part is formed at the center part of the bottom part of the container, cooling of at least one of the stretching rod and the supporting pin will suffice.

INDUSTRIAL APPLICABILITY

For the two-stage blow-molded container having high retort resistance according to the present invention, completion of the retort processing can be confirmed and supervised with simple means without the need of an expensive member or facility to obtain the heating history, the production operator can reliably confirm and perfectly supervise completion of the retort processing in the production process for the plastic container product containing food or drink, whether the retort processing is adequately performed, rather than whether the temperature of the retort processing is reached, can be confirmed, and not only the producer but also the consumer can confirm completion of the retort processing by an easy and simple confirming method.

Thus, since completion of the retort processing can be simply and reliably confirmed, the present invention has an extremely high industrial applicability in the field of the plastic container for food or drink.

The invention claimed is:

1. A method for producing a thermoplastic resin container for distinguishing before and after retort processing comprising:
    performing stretch blow molding on a preform made of a thermoplastic resin, thereby obtaining an intermediate body;
    heating the intermediate body to cause heat shrinkage;
    performing secondary stretch blow molding on the intermediate body wherein a part of the intermediate body is not stretched or insufficiently stretched and is rapidly cooled by a stretching rod, the bottom surface of the stretching rod being preliminarily cooled in cooling blocks, thermal effect of the cooling blocks being reduced by heat insulators;
    packing and sealing a content in the container; and then, heating the content and the container in a retort processing thereby whitening the transparent or translucent part not stretched or insufficiently stretched,
    wherein the secondary stretch blow molding is a biaxial stretch blow molding wherein the part that is not stretched or insufficiently stretched is at a bottom of the intermediate body,
    wherein the secondary stretch blow molding of the intermediate body is performed by longitudinally stretching the intermediate body with a stretching rod whose bottom surface of the tip end is cooled so that the part that is not stretched or insufficiently stretched and rapidly cooled is formed at a center part of a bottom part of the container.

2. A method for producing a thermoplastic resin container for distinguishing before and after retort processing comprising:
    performing stretch blow molding on a preform made of a thermoplastic resin, thereby obtaining an intermediate body;
    heating the intermediate body to cause heat shrinkage;
    performing secondary stretch blow molding on the intermediate body wherein a part of the intermediate body is not stretched or insufficiently stretched and is rapidly cooled by a stretching rod and a supporting pin, wherein the bottom surface of the stretching rod is preliminarily cooled in cooling blocks, the upper surface of the supporting pin is also preliminarily cooled, and the thermal effect of the cooling blocks is reduced by heat insulators;
    packing and sealing a content in the container; and then, heating the content and the container in a retort processing thereby whitening the transparent or translucent part not stretched or insufficiently stretched,
    wherein secondary stretch blow molding of the intermediate body is performed by holding the bottom of the intermediate body between the stretching rod whose bottom surface of the tip end is cooled and a supporting pin whose upper surface is cooled.

* * * * *

UNITED STATES PATENT AND TRADEMARK OFFICE
CERTIFICATE OF CORRECTION

PATENT NO.       : 8,621,829 B2                              Page 1 of 1
APPLICATION NO. : 12/447020
DATED            : January 7, 2014
INVENTOR(S)      : Sakaguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1220 days.

Signed and Sealed this
Twenty-second Day of September, 2015

Michelle K. Lee
*Director of the United States Patent and Trademark Office*